(12) United States Patent
Kakiuchi et al.

(10) Patent No.: US 7,471,404 B2
(45) Date of Patent: Dec. 30, 2008

(54) IMAGE PROCESSOR AND RECORDING MEDIUM

(75) Inventors: Takashi Kakiuchi, Kyoto (JP); Shinya Sonoda, Kyoto (JP); Tetsuya Miwa, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 979 days.

(21) Appl. No.: 10/362,742

(22) PCT Filed: Aug. 9, 2001

(86) PCT No.: PCT/JP01/06875

§ 371 (c)(1),
(2), (4) Date: Jul. 30, 2003

(87) PCT Pub. No.: WO02/21824

PCT Pub. Date: Mar. 14, 2002

(65) Prior Publication Data

US 2004/0051897 A1    Mar. 18, 2004

(30) Foreign Application Priority Data

Aug. 31, 2000    (JP) .............................. 2000-264540

(51) Int. Cl.
*G06F 15/00* (2006.01)
*G06K 9/00* (2006.01)
(52) U.S. Cl. ..................... 358/1.14; 382/162
(58) Field of Classification Search ............... 358/1.14, 358/1.15, 461, 1.6, 442; 382/162, 209, 218; 379/245, 269, 279; 709/203, 220; 710/15–16; 399/366; 380/51
See application file for complete search history.

(56) References Cited

U.S. PATENT DOCUMENTS

| 6,546,129 | B1 * | 4/2003 | Ohta et al. ................. 382/162 |
| 2005/0225793 | A1 * | 10/2005 | Namikata .................. 358/1.14 |

FOREIGN PATENT DOCUMENTS

| EP | 1043883 A2 | 10/2000 |
| JP | 60-159992 A | 8/1985 |
| JP | 07-212580 | 8/1995 |
| JP | 09-018708 | 1/1997 |
| JP | 2000-231758 A | 8/2000 |

* cited by examiner

*Primary Examiner*—Saeid Ebrahimi Dehkordy
(74) *Attorney, Agent, or Firm*—Foley & Lardner LLP (57) ABSTRACT

An authentic scanner driver 11 provided with a function of preventing unauthorized use is installed in a personal computer 10. Data is sent and received with a color scanner 20 via the driver. The color scanner 20 is provided with a driver recognition portion 22 for making a decision as to whether the connection target is an authentic driver. Only where the driver is judged to be an authentic driver, normal image processing (acceptance and transfer of data) is performed. Where the driver is not an authentic driver, the normal image processing is stopped. Thus, the unauthorized use preventing function incorporated in the driver is operated with certainty. Monitoring is done to detect whether fraudulent processing such as forgery is performed. Consequently, unauthorized use can be prevented.

8 Claims, 10 Drawing Sheets

IMAGE PROCESSOR AND RECORDING MEDIUM

TECHNICAL FIELD

This invention relates to an image processor and recording medium for preventing unauthorized use.

BACKGROUND ART

With respect to conventional image recognition systems coping with forgery of paper currencies and securities, various types have been proposed and put into practical use for apparatus in which from image inputting to image creation are implemented within a closed system such as color copiers. Furthermore, as image readers such as image scanners, personal computers, and image creation apparatus such as printers improve in performance and decrease in price in recent years, forgery in an open system has constituted a social problem. Countermeasures against it have been variously studied.

In any case, the fundamental image recognition processing consists of steps of processing obtained image data (input data) by an image data processing portion (feature extraction portion), comparing image data output by the image data processing portion and certain patterns previously stored in a nonvolatile memory or the like, and outputting the results of recognition to a control portion.

To carry out this recognition processing, it is possible to adopt either a method of installing dedicated hardware or a method of installing software. With decrease of prices of apparatus such as scanners and printers, it is also necessary to reduce the cost of the system for performing recognition processing. Preferably, this is achieved in software. Furthermore, as processing capabilities of CPUs have improved in recent years, practically acceptable processing speeds have been obtained even with recognition processing by software.

Where mounting software is considered, a method of mounting into a personal computer and a method of mounting into an external device connected with a personal computer such as a scanner or printer are conceivable. Usually, personal computers are higher in processing capability than external devices. Furthermore, personal computers have larger storage capacities. Therefore, it is realistic to mount on the personal computer side.

Specifically, forgery prevention software including recognition dictionary and engine is incorporated in a driver for an external device that should be prevented against forgery. Then, where various external devices are used, data is sent and received always via the driver. Therefore, recognition processing owing to the forgery prevention software is reliably performed. Thus, forgery prevention can be accomplished.

While software can be easily loaded into personal computers, an environment thereof can be easily altered. Therefore, a driver for such an external device can be developed, and image data can be input and output between the external device and the personal computer using the developed driver. Then, no forgery prevention software is incorporated in the developed driver. This enables unauthorized use.

It is an object of this invention to provide a device such as a color printer, color scanner, and computer used in an open system with an image processor and recording medium capable of reliably preventing unauthorized use.

DISCLOSURE OF THE INVENTION

An image processor according to this invention is an image processor connected with a computer in an image processing system. This processor is provided with decision means for making a decision as to whether the connection target connected with the image processor is an authentic connection target having a function of preventing duplication of copy-inhibited matter. The processor is so configured that normal image processing is performed only when the connection target is judged to be the authentic connection target.

Under the same preconditions, the processor can be also so constructed that it has decision means for making a decision as to whether the connection target connected with the image processor is an authentic connection target having a function of preventing duplication of copy-inhibited matter, and control means that performs normal image processing where the decision means has recognized that the connection target is an authentic connection target. Where the decision means has recognized that the connection target is not an authentic connection target, the control means stops the normal image processing.

The connection target can be a driver program, for example, for the image processor, the program being used to send and receive data between the image processor and the computer. The image processor constructs an image processing system by being connected with the computer. For example, the processor includes a scanner and printer. Furthermore, the decision means and control means are realized by one driver recognition portion 22 in a mode of practice. The function of preventing duplication of copy-inhibited matter makes a decision as to whether image data on the processed subject is copy-inhibited matter that is inhibited from being duplicated, read out, or printed out such as paper currency, securities, or confidential document. If it is copy-inhibited matter, various kinds of processing are performed to inhibit normal output. This may be referred to as the "function of preventing unauthorized use" herein. This function itself of preventing unauthorized use may actually prevent normal output but this is not always required to be performed. Various kinds of notifications for preventing normal output may be issued.

"To stop normal image processing" contains, of course, a case where the processing itself is not done. Various methods can be also adopted. For instance, the resolution or quality may be impaired, a color or characters may be superimposed on parts, or a mark is attached on the matter indicating that it is copy-inhibited matter and the matter is delivered.

"Normal output is inhibited" contains, of course, a case where output itself is not done as literalized. Various methods can be also adopted. For instance, the resolution or quality may be impaired, a color or characters may be superimposed on parts, or a mark is attached on the matter indicating that it is copy-inhibited matter and the matter is delivered, as same as the case of "To stop normal image processing" described above.

In cases where "normal output is inhibited", the control means realizes this by operating to cut off the connection with the connection target where the decision means judges that the connection target is not an authentic one. Here, to cut off the connection, of course, includes cancellation of the connection. A case where the original state is resumed and the connection processing is executed from the beginning is also included. In any case, an initializing operation is performed. It takes some time until mutual data transmission is made possible. This is desirable.

According to this invention, where an authorized connection target having a function of preventing unauthorized use is present in a computer, the image processor side checks that the authorized connection target is present and then performs normal image processing. That is, where the image processor is a scanner, processing is performed to take in image data and to transfer it to the computer. Furthermore, where the image processor is a printer, the gained image data is printed out. In any case, the computer is equipped with the function of preventing unauthorized use. Therefore, where image data to be processed is copy-inhibited matter, normal processing is stopped by the function of preventing unauthorized use.

Where an image processing system is constructed using a connection target having no function of preventing unauthorized use and given image processing is attempted, when the decision means judges that the connection target is not an authentic connection target, then the control means stops the normal image processing. Again, fraudulent or unauthorized use can be prevented in advance.

The decision as to whether the connection target is an authentic connection target can be made based on data sent from the connection target side. That is, where a title is attached to the connection target, for example, the title is sent. The decision means holds information (title in this case) previously sent in from the authentic connection target. The decision means can judge whether it is authentic or not, depending on whether the former agrees with the latter or not. Furthermore, data to which security information for identifying the connection target is attached is sent from the connection target to enhance the security further, rather than simply sending the title. The decision means can judge whether the security information is authentic or not. The security information is information for demonstrating the issuing source (connection target) such as an electronic signature and electronic watermark.

Furthermore, at least a part of data sent and received with the connection target may be encrypted. The "at least a part of the data" can be either "some of a plurality of data items" or "a part of data sent or received in one operation" where there are plural data items to be sent or received. Of course, all the data may be encrypted. With respect to the "data sent and received", either one of the connection target and image processor may be a sending source; it suffices to encrypt only one-side communication. That is, only data sent from the connection target may be encrypted or only data sent from the image processor may be encrypted. Of course, there is no hindrance in encrypting both.

In the case of an authentic combination, the sent data can be decrypted by attaching information for decryption to the image processor and to the connection target. Based on it, given processing can be performed. In cases where the combination is not authentic, data itself that should be encrypted is sent unencrypted or encrypted differently. As a result, the data cannot be decrypted with the held information, or there is no information to be decrypted and undecrypted data gives rise to unusable result. In any case, normal image processing cannot be performed and so unauthorized use can be prevented.

Where the data cannot be decrypted normally or sent in without being encrypted to begin with in this way, it can be judged that the connection target is not an authentic one. That is, the decision means of the present invention includes both a case where an active decision is made as to whether the subject is authentic, based on information about the title of the connection target or security information and a case where a passive decision is made utilizing the above-described encryption technique and recognizes that only an authentic one operates normally. In the latter case, the decision means includes execution of decryption processing and execution of encryption processing.

The decision means may be preferably so constructed that it encrypts at least a part of data sent to the connection target and judges whether the connection target is authentic or not, depending on whether the connection target can be decrypted normally, or that the connection target receives at least partly encrypted data and judges whether the connection target is authentic or not, depending on whether the received data can be decrypted normally.

Based on the inventions described above, image recognition means for recognizing that a copy-inhibited image is contained in the input image data is provided. Where the decision means judges that the connection target is an authentic connection target, one of the function of the image recognition means and the function of preventing duplication of a copy-inhibited object may be stopped. The latter function is provided on the normal connection target.

As such, in the case where the function (unauthorized use preventing function) of preventing duplication of copy-inhibited matter is deleted on the side of the connection target, unauthorized use can be prevented by the image recognition apparatus. In the case of a normal connection target, unauthorized use preventing functions exist both on the computer side and on the image processor side. If processing is performed on both sides, it takes time. This deteriorates the intrinsic performance of the image processing system. Accordingly, only one of them is operated.

On the other hand, a recording medium according to the invention is combined with the above-described image processor to effectively realize the function (unauthorized use preventing function) of preventing duplication of copy-inhibited matter. The recording medium is a recording medium loaded with a driver program installed in a computer for controlling the image processor within the image processing system made up of the computer and the image processor connected with it. In the recording medium, the driver program has an unauthorized use preventing program for preventing duplication of copy-inhibited matter and a program for performing processing for notifying the image processor (i.e., communication partner) that it is provided with the unauthorized use preventing program.

The notifying processing may consist only of sending driver information such as the driver's title. The processing may perform processing for creating data to which security information is attached and outputting it. Furthermore, the processing may include processing for encrypting some or all of the notified data. Thus, the security can be enhanced further. In addition, a program for executing processing for decrypting encrypted image data sent in from the image processor may be provided.

The constituent elements of the invention described thus far can be combined as many as possible. The various means constituting the image processor according to this invention may be realized by a dedicated hardware circuit. Also, they may be realized by programmed software.

BEST MODE FOR CARRYING OUT THE INVENTION

In describing the present invention in further detail, it will be described according to the accompanying drawings.

Figure 1:
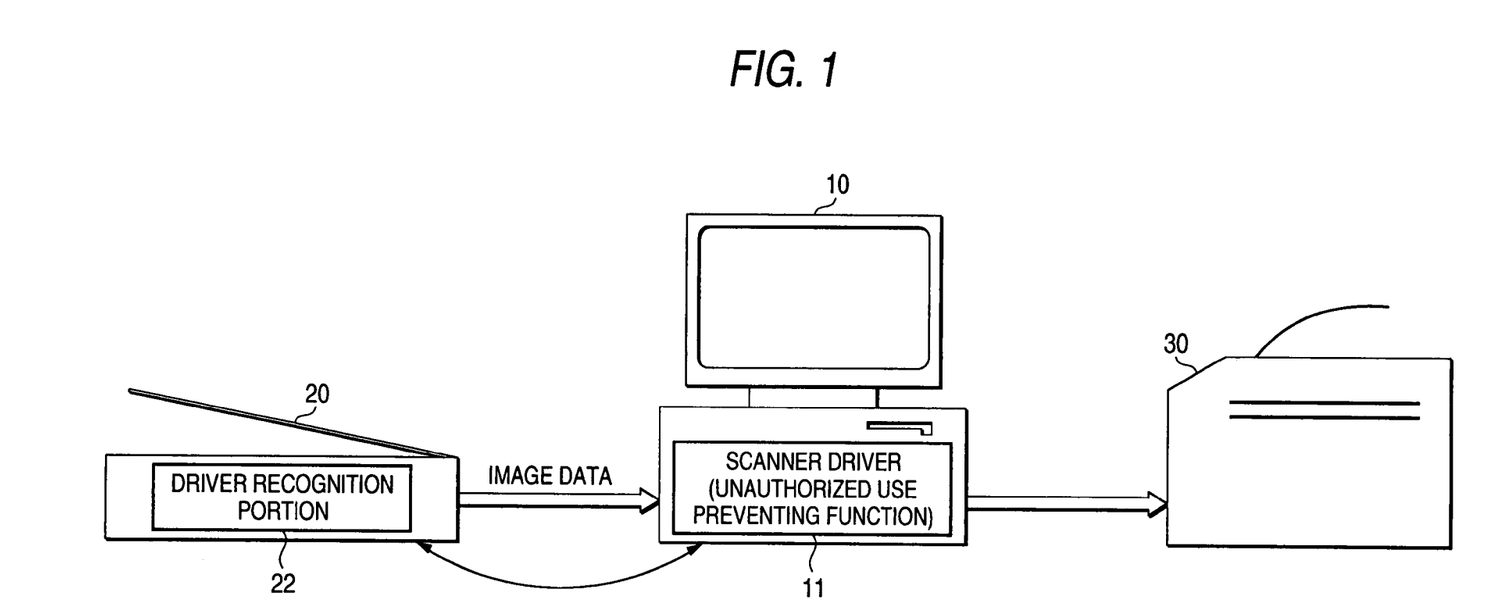
FIG. 1 is a view showing one example of a system to which the present invention is applied.

FIG. 1 shows one example of an open system to which the present invention is applied and which is used to output an image. As shown in this figure, a color scanner 20 and a color printer 30 are connected with a personal computer 10. Image data read in by the color scanner 20 is sent to the personal computer 10, where given image processing is performed. Then, the data is printed out from the color printer 30. Of course, the image data processed by the personal computer 10 is not limited to that sent from the color scanner 20 as mentioned above. The data may also be supplied via a recording medium such as MO and FD.

In the description of the illustrated example, the personal computer 10, color scanner 20, and color printer 30 are connected directly by general interfaces. The invention is not limited to this but rather embraces one where they are networked. That is, the installation locations may be remote.

A scanner driver 11 is installed on the personal computer 10 side. This scanner driver 11 includes a normal driver program. In addition, it has a program incorporating a function (unauthorized use preventing function) of preventing duplication of copy-inhibited matter. That is, a recognition dictionary for detecting copy-inhibited matter such as paper currencies and securities, and an image recognition engine are incorporated. In the following description, an example in which an unauthorized use preventing function is incorporated in the scanner driver for the color scanner 20 is described. Such an unauthorized use preventing function may be added to the printer driver for the color printer 30, and given processing may be executed with the color printer 30. Normal image creation/output processing may be performed only in response to the output from the authentic driver.

The scanner driver 11 having the unauthorized use preventing function has a function intrinsic to the driver, i.e., image data sent from the color scanner 20 is accepted into the body of the personal computer 10. In addition, the scanner driver performs image recognition processing on the gained image data and makes a decision as to whether it is copy-inhibited matter. Where it recognizes that it is copy-inhibited matter, normal image processing is inhibited. Various kinds of procedures can be adopted as this processing for inhibiting the normal image processing. For example, the gained image data is abandoned. The image is partially or totally impaired in resolution or quality. Information indicating that it is copy-inhibited matter is attached and stored.

Figure 2:
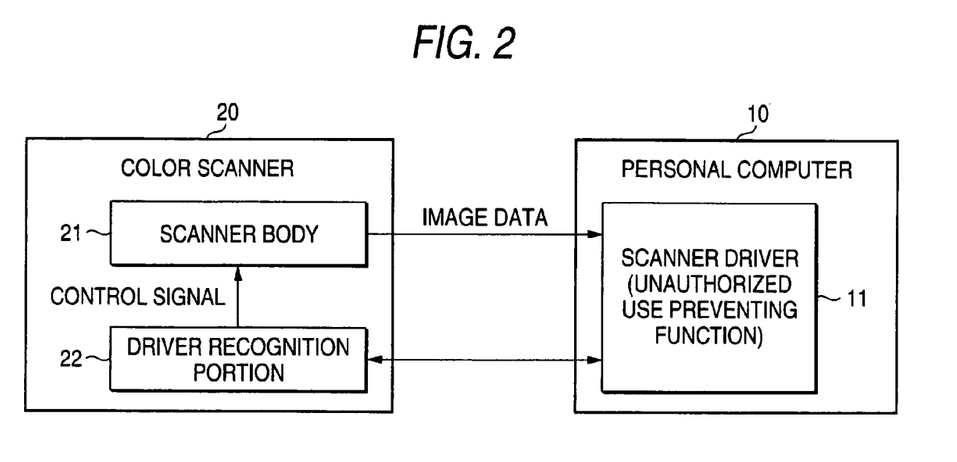
FIG. 2 is a diagram showing a first mode of practice of the invention.

In the present mode of practice, as shown in FIG. 2, the color scanner 20 that is an external device has an image processing body portion 21 for realizing a function of reading an image, the function being intrinsic to the scanner. In addition, a driver recognition portion 22 is provided in the scanner. That is, the image processing body portion 21 reads in a document placed on a document table and accepts image data. After performing image processing such as exposure correction about the accepted image data, the image data is transferred to the personal computer 10. This processing function is the same as in the prior art.

The driver recognition portion 22 that is a main portion of the invention is installed in the personal computer 10 and makes a decision as to whether the driver communicating with the color scanner 20 is an authentic driver. In the case of an authentic driver, a normal operation is performed. That is, the gained image data is sent to the personal computer 10 side. On the other hand, where it is not a normal driver, a function-limiting operation is performed. This function limitation can perform inhibiting processing in the same way as when it is recognized as copy-inhibited matter. For example, the image data is not sent intact but processed and then sent to the personal computer. Furthermore, data communication itself may also be stopped.

Figure 3:
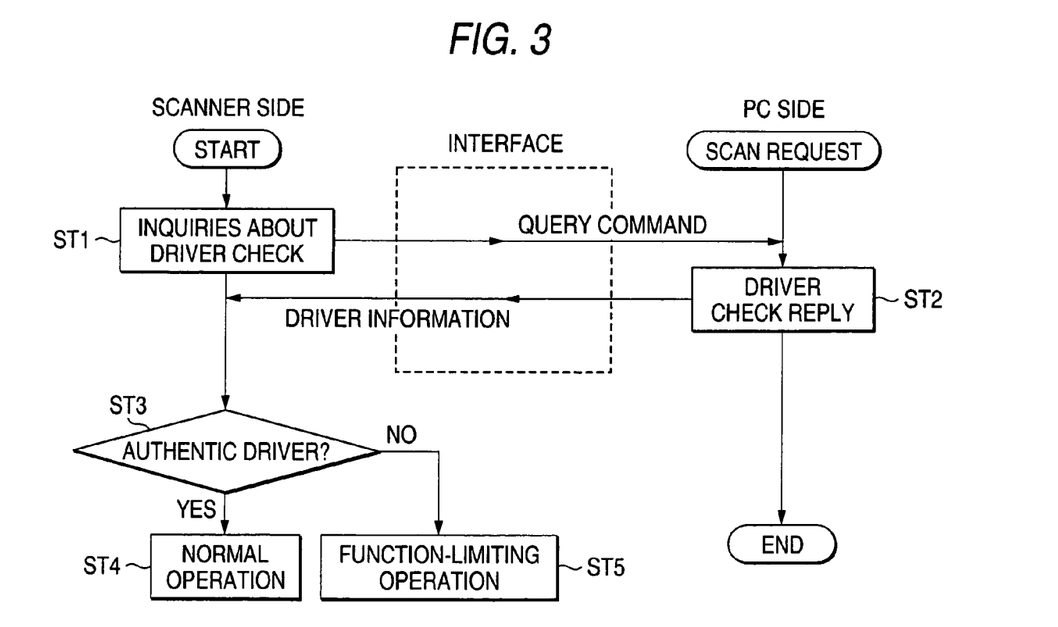
FIG. 3 is a diagram illustrating its processing procedure.

In particular, the color scanner 20 side and personal computer 10 side have a function for realizing the flowchart shown in FIG. 3. That is, prior to the operation of the image processing body portion 21 of the color scanner 20, the driver recognition portion 22 inquires of the personal computer 10 about the driver check (ST1). That is, the body portion requires the personal computer 10 to send back driver information (e.g., driver title) for the color scanner 20 installed in the personal computer 10.

The personal computer 10 receiving it performs a driver check response (ST2). That is, the driver title of the used scanner driver is sent as driver information back to the color scanner 20 side.

The driver recognition portion 22 gains the driver information sent back and makes a decision as to whether it is an authentic driver equipped with a function of preventing unauthorized use (ST3). That is, it judges whether the driver title sent in is coincident with the stored driver title. If they agree, the recognition portion judges that it is an authentic driver and enables the image processing body portion 21 to perform normal operation (ST4). Concomitantly, the accepted image data is accepted into the personal computer via the scanner driver 11 of the personal computer 10.

Of course, this "enabling of normal operation" includes active notification of enabling. The enabling also includes passive enabling such as execution of normal operation provided no specific notification is issued. Furthermore, it may only consist of producing a trigger signal for the start of operation to the image processing body portion 21.

On the other hand, if the driver recognition portion 22 judges that no authentic driver is connected, it performs a function-limiting operation (ST5). That is, the driver recognition portion 22 sends a control signal to the image processing body portion 21. Concomitantly, the image processing body portion 21 transfers a processed image (e.g., the image data is partly or totally impaired in resolution or quality or its colors are changed). It is also possible to once cancel the communication itself between the personal computer 10 and the color scanner 20, and it is again executed from the beginning.

Figure 4:
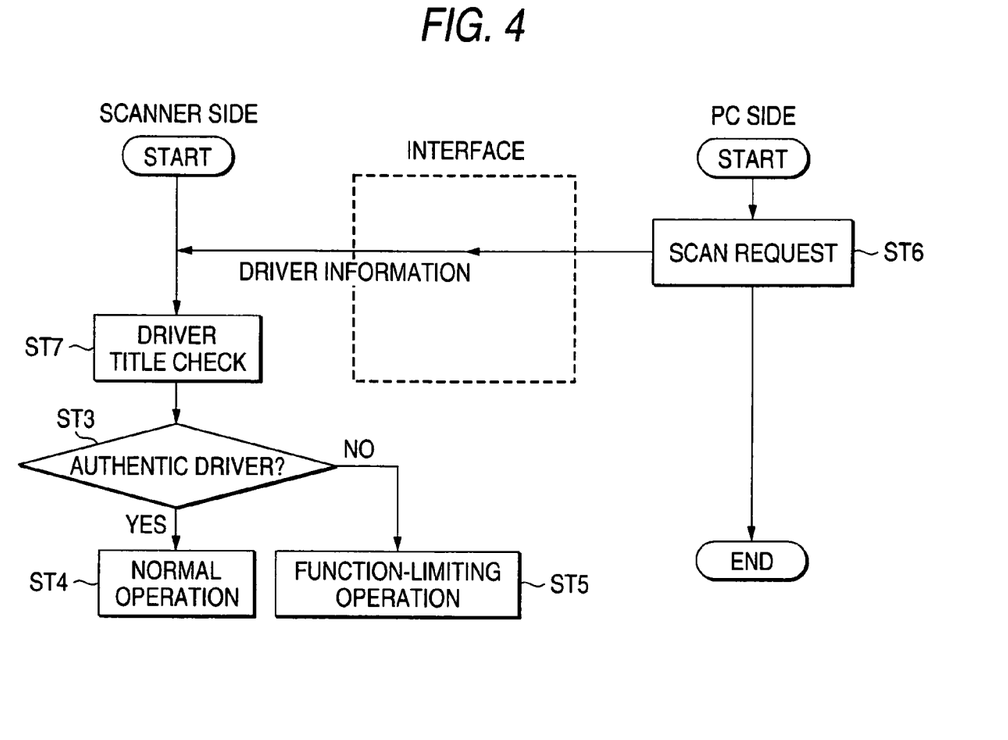
FIG. 4 is a diagram showing a second mode of practice of the invention.

FIG. 4 shows main portions of a second mode of practice. In the present mode of practice, a driver title is transferred together with the scan request sent from the personal computer 10 side as a pair, unlike the above-described mode of practice. That is, normally, where the color scanner 20 is operated and image data is taken in, a scan request is sent as an operation order from the personal computer 10 side. Accordingly, when this scan request is sent, driver information is also sent (ST6). That is, this scan request sends the driver title that is driver information and command data showing contents of an actual instruction as a pair to the color scanner 20. The scan request in which the driver title is integrated with the command data is created by the scanner driver 11 provided with the function of preventing unauthorized use.

On the color scanner 20 side, the driver recognition portion 22 extracts the driver title in the scan request and makes a decision as to whether the driver is authentic (ST7 and ST3). In the case of a normal driver, normal processing corresponding to the received command data is carried out (ST4). Where it is not an authentic driver, a function-limiting operation is performed (ST5). Since the decision as to whether it is an authentic driver or not and correspondence based on the results of the decision are similar to those of the above-described first mode of practice, their detailed description is omitted.

Figure 5:
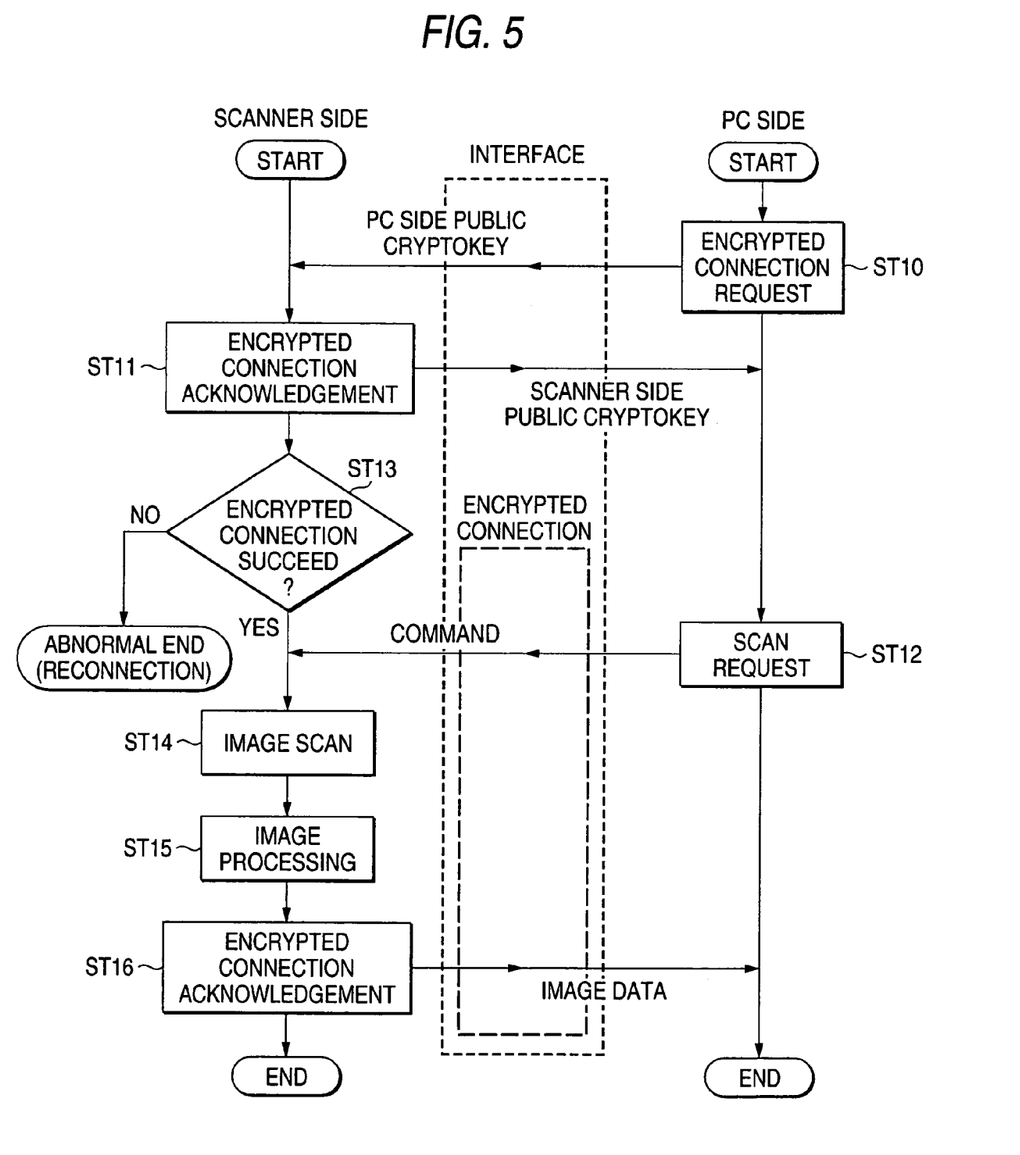
FIG. 5 is a diagram showing a third mode of practice of the invention.

FIG. 5 is a flowchart illustrating the functions of main portions of a third mode of practice of the invention. In the above modes of practice, driver information (driver title) is sent as material for decision as to whether the driver is authentic or not from the personal computer 10 to the color scanner 20 side. In the present mode, the interface for sending and receiving information between the personal computer 10 (scanner driver 11) and the color scanner 20 is encrypted.

That is, if it is discovered that "authenticity is judged according to the driver title" and the "formal driver title", then there is a danger that a forgery scanner driver only a driver title of which is identical with the genuine one but is not provided with the function of preventing unauthorized use is manufactured and used. Therefore, the devise illustrated in a first or second mode of practice described above has the possibility of being recognized as authentic one.

Accordingly, in the present mode of practice, the interface i.e., the connection means (interface protocols) is encrypted to attempt an encrypted connection. Thus, the connection target is automatically recognized. Therefore, normal operations can be performed only with a certain connection target, i.e., only with the authentic driver. Therefore, where a false driver having a forged driver title is used for unauthorized use, the connection itself is not made. Transmission itself of image data taken in by the color scanner 20 to the personal computer 10 side can be hindered. Consequently, forgery can be prevented. Using the authentic driver, the image data can be transferred to the personal computer 10. Hence, there is no harmful effect on the authentic user.

To realize such processing, an encrypted connection request is issued from the personal computer 10 (scanner driver 11) to the color scanner 20 as shown in FIG. 5 (ST10). That is, the public cryptokey on the personal computer side is sent. According to this encrypted connection request, the color scanner 20 side sends an encrypted connection acknowledgement (ST11). That is, the public cryptokey on the scanner side is sent. In consequence, an encrypted connection is attempted using the mutually gained public cryptokeys.

The driver recognition portion 22 on the color scanner 20 side makes a decision as to whether the encrypted connection has succeeded (ST13). If it fails, an abnormal end is effected. A reconnection is attempted. If the encrypted connection succeeds, data is sent and received under the state of the encrypted connection. That is, the personal computer 10 side issues a scan request (command) (ST12). The color scan 20 side receiving the scan request accepts the data on the image placed on the document stage (image scan) and then performs image processing such as exposure correction and creates image data (ST14 and ST15). The created image data is transferred as an encrypted connection acknowledgement to the personal computer 10 side (ST16). The processing is ended. The steps of processing from the scan request of step 12 to the transfer of the image data of step 16 are the same as the prior art except that an encrypted connection is made. Therefore, detail description of the various portions is omitted.

Figure 6:
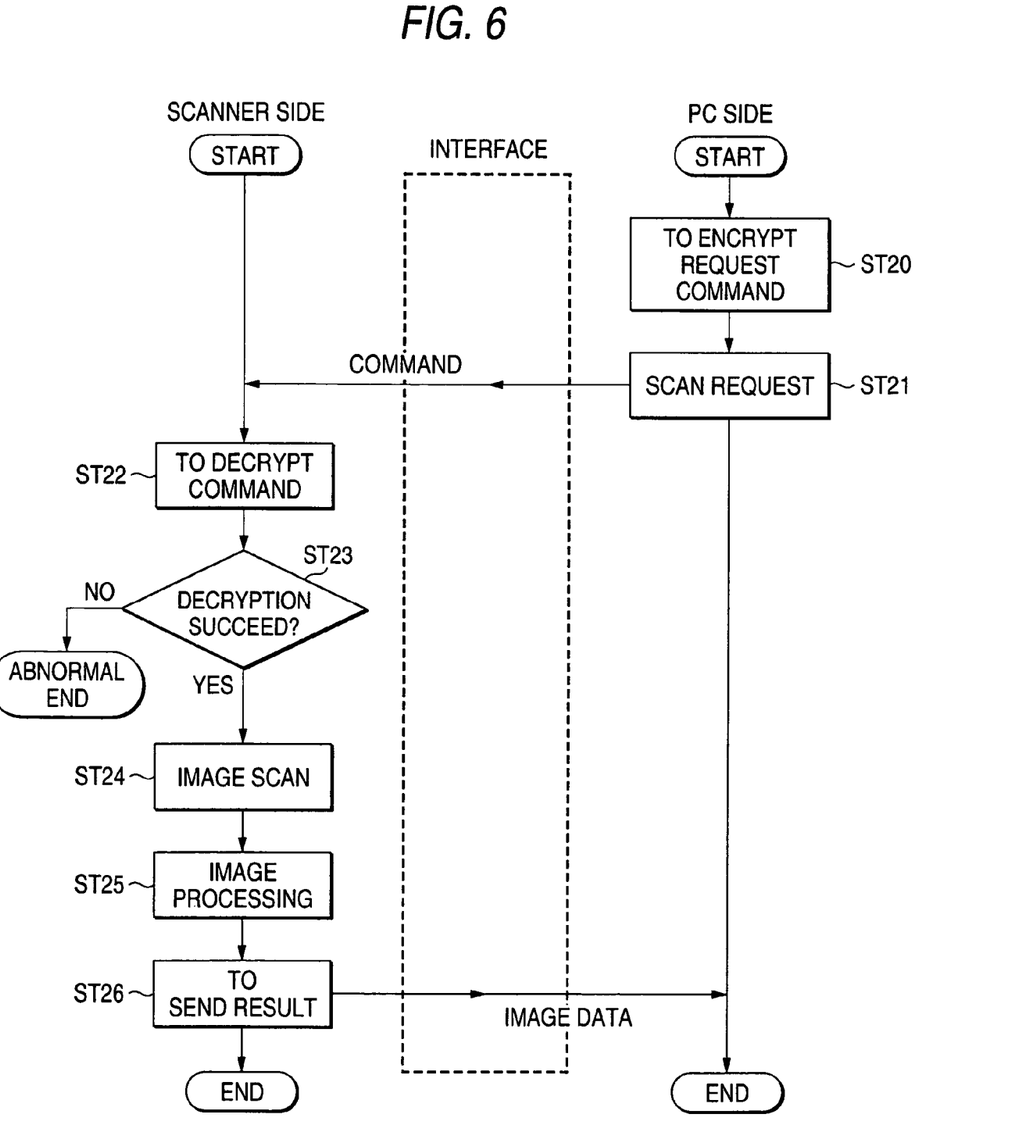
FIG. 6 is a diagram showing a fourth mode of practice of the invention.

FIG. 6 is a flowchart illustrating the functions of main portions of a fourth mode of practice of the invention. In the above-described third mode of practice, the interface is encrypted. Alternatively, in the present mode of practice, data is partially or fully encrypted. And, in the present mode of practice, some improvements are made based on the second mode of practice.

That is, information for decrypting a cryptogram is previously incorporated on the color scanner 20 side. The personal computer 10 (scanner driver 11) reads in a request command to be transmitted, and encrypts the request command to be transmitted (ST20). With this encryption, in case of that the scan request has a data architecture where the driver title and a specific command data are paired, it is possible to encrypt one or both of the "driver title" and "command data". Furthermore, only a part of the command data may be encrypted rather than all of the data is encrypted. Then, the scan request (already encrypted) generated as mentioned above is sent to the color scanner 20 side (ST21).

On the other hand, on the color scanner 20 side, the received scan request (already encrypted) is decrypted, and the contents of the meaning of the command are analyzed (ST22). Then, the driver recognition portion 22 makes a decision as to whether the decryption has succeeded (ST23). Where it fails, an abnormal end is effected, and a reconnection is attempted. If the encryption has succeeded, image data is taken in (image scan), based on the decrypted scan request (command). Then, image processing such as exposure correction is performed, and image data is created (ST24 and ST25). The created image data is sent to the personal computer 10 side (ST26). The processing is ended. The steps of processing from the image scan of step 24 to the transfer of the image data of step 26 are the same as the prior art. Therefore, detail description of the various portions is omitted.

In the above modes of practice, examples in which data sent from the personal computer 10 side (i.e., scan request (command)) are encrypted are shown. Encryption of data between the personal computer 10 and the color scanner, however, 20 is not limited to the foregoing. Data sent from the color scanner 20 to the personal computer 10 side (i.e., the accepted image data) may be encrypted.

Figure 7:
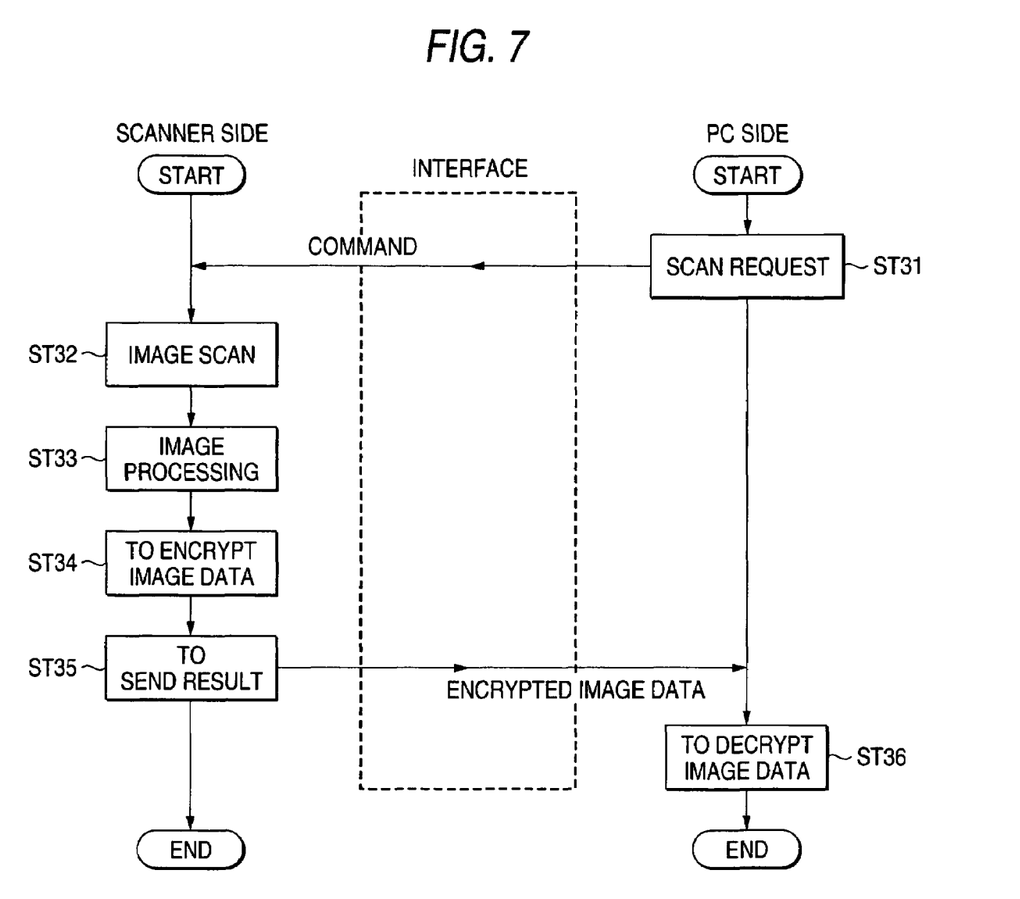
FIG. 7 is a diagram illustrating an example of modification.

In particular, as shown in FIG. 7, according to a scan request (ST31) from the personal computer 10 side, the color scanner 20 side takes in the image data (image scan) and then performs image processing such as exposure correction. Image data is created (ST32 and ST33). The created image data is encrypted, and the encrypted image data is transferred to the personal computer 10 side (ST34 and ST35). With respect to encryption of the image data, all the image data may be encrypted or a part of the image data may be encrypted.

In the personal computer 10 gaining the encrypted image data, as the authentic driver previously possesses information necessary for decryption, the gained image data is decrypted (ST36). Then, given processing such as processing and saving of the data is performed. Of course, the authentic driver has a function of preventing unauthorized use and, therefore, performs given image recognition processing about the decrypted image data. It makes a decision as to whether the subject is copy-inhibited matter such as a paper currency. Where it is copy-inhibited matter, given inhibition processing is performed.

In the case of a non-authentic driver, as it has no information for decryption it cannot decrypt the gained image data. The accepted image cannot be used. Since the image data itself is encrypted in this way, in the case where the decryption fails, unauthorized use is not allowed. Therefore, a decision is not made as to whether the decryption is successful or not. Of course, a decision may be made, and when the decryption fails, some message such as "Please use an authentic driver" may be output onto the display device of the personal computer 10. If such an error message is output, a user in good faith who has changed the driver by chance is informed that normal image data is not transmitted not because the apparatus is at fault. This is favorable.

Displaying a message on the display device in this way is not limited to the present mode of practice. It can be similarly applied to the modes of practice already described and to modes of practice described below.

Figure 8:
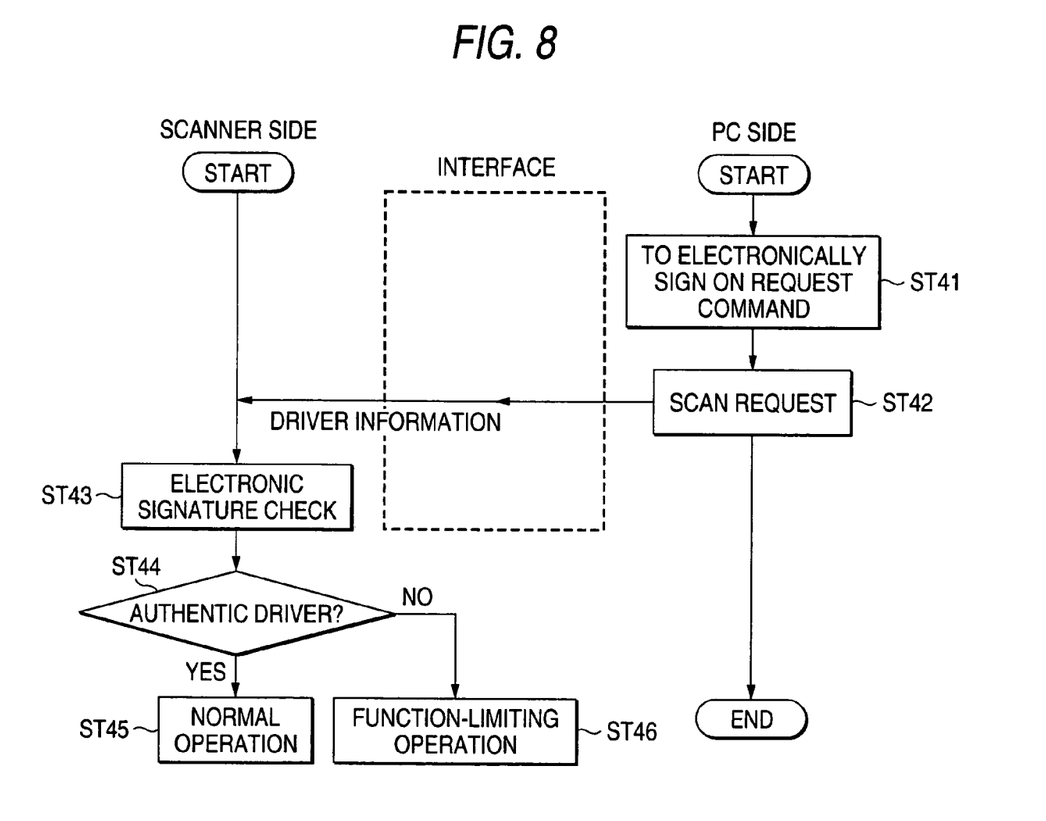
FIG. 8 is a diagram showing a fifth mode of practice of the invention.

FIG. 8 is a flowchart illustrating the function of main portions of a fifth mode of practice of the invention. In the above first mode of practice, a driver title is sent as driver information, and a decision is made as to whether the driver title gained by the driver recognition portion 22 is authentic or not. In the present mode of practice, an electronic signature is attached to the request command. The driver recognition portion 22 obtains normal processing on the condition that an authentic electronic signature is attached.

Specifically, as a premise, the driver recognition portion 22 of the color scanner 20 stores and holds an electronic signature that the authentic driver supplies. First, the personal computer 10 (scanner driver 11) electronically signs on a transmitted request command (ST41). Then, the electronically signed request command is sent as a scan request to the color scanner 20 side (ST42).

On the other hand, when receives the scan request, the driver recognition portion 22 of the color scanner 20 checks the digital signature affixed to the scan request. Then, the recognition portion makes a decision as to whether it agrees with the authentic digital signature stored and held (ST43 and ST44).

If the electronic signature agrees and is judged to be an authentic driver, normal operations (image scan→image processing→image transfer) are performed (ST45). In the case where it is not an authentic driver, various operations for limiting functions are executed (ST46). The operations for limiting the functions are the same as already described in the first mode of practice.

Figure 9:
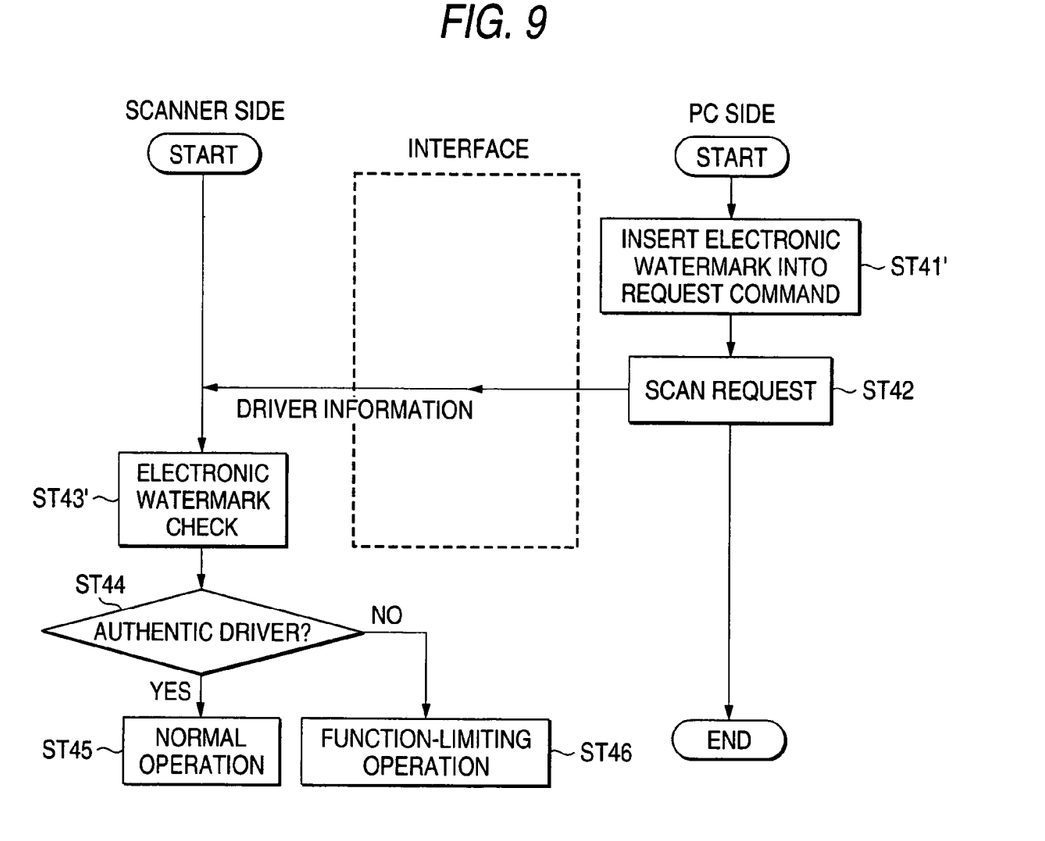
FIG. 9 is a diagram showing an example of modification.

The information attached to the request command is not limited to the above-described electronic signature. For example, an electronic watermark, for example, may be inserted instead of an electronic signature. In particular, as shown in FIG. 9, the scanner driver 11 of the personal computer 10 inserts an electronic watermark (ST41') in the request command. The request command containing the electronic watermark is sent as a scan request to the color scanner 20 side (ST42).

On the other hand, in case of that the driver recognition portion 22 of the color scanner 20 receives the scan request, the portion checks the electronic watermark attached to the scan request and makes a decision as to whether this agrees with the authentic electronic watermark stored and held (ST43' and ST44). If the electronic watermark agrees and is judged to be an authentic driver, normal operations are performed (ST45). In the case where it is not an authentic driver, operations for limiting various functions are performed (ST46).

The driver title may also be stored in the request command together with the electronic signature. The decision as to whether it is an authentic driver may be made as follows. It is recognized as an authentic driver only if the electronic signature and driver title are both authentic. In this way, various modes of practice can be combined. Furthermore, the above-described encryption technology may be applied to that to which this electronic signature or electronic watermark is attached, and data or connection processing may be encrypted. In this way, plural modes of practice can be combined and implemented.

Figure 10:
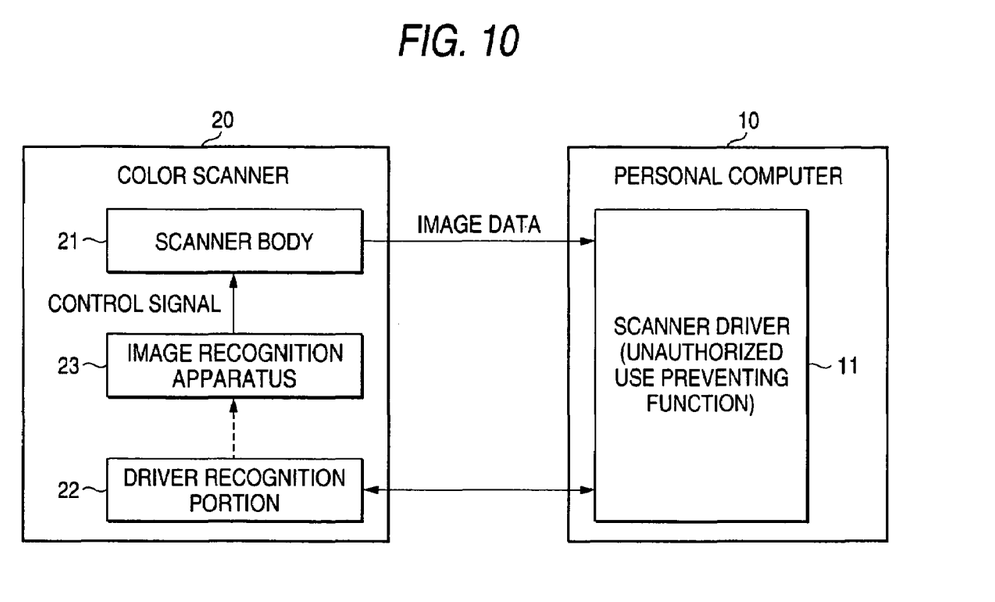
FIG. 10 is a diagram showing a sixth mode of practice of the invention.
Figure 11:
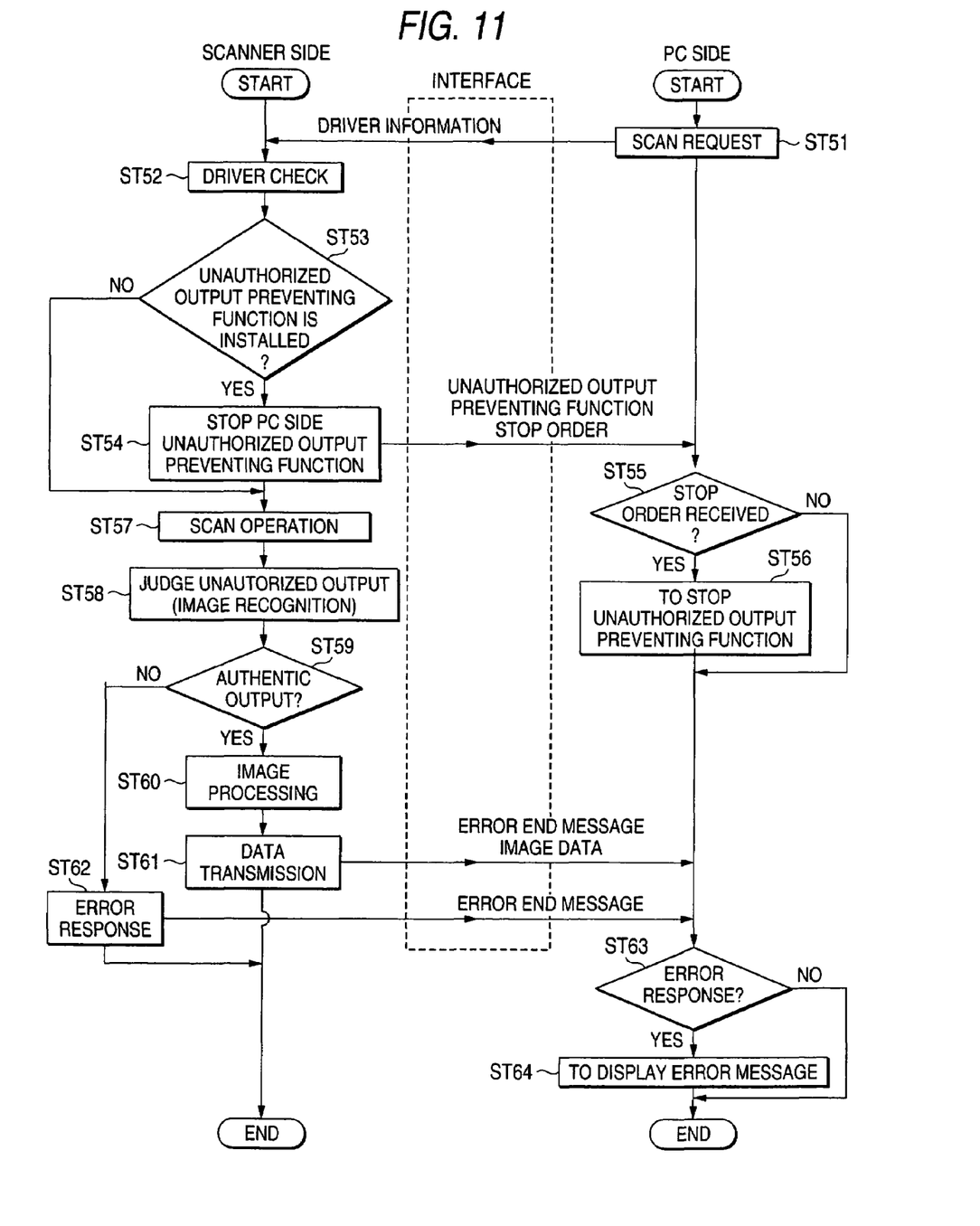
FIG. 11 is a diagram illustrating its processing procedure.

FIGS. 10 and 11 show a sixth mode of practice of the invention. In the present mode of practice, an unauthorized use preventing function is also incorporated on the color scanner 20 side acting as an external device. Where an authentic driver having the unauthorized use preventing function is incorporated on the personal computer 10 side, deterioration of the performance is prevented by running only one unauthorized use preventing function.

In particular, in case of that image recognition apparatus 23 where the unauthorized use preventing function installed in the color scanner 20 is constituted by hardware as shown is used, recognition processing is performed using the image recognition apparatus 23 having a high processing speed. The unauthorized use preventing function incorporated as software in the scanner driver 11 is stopped. That is, as in the flowchart shown in FIG. 11, a scan request is issued from the scanner driver 11 of the personal computer 10 to the color scanner 20 together with driver information (driver title, electronic signature, electronic watermark, etc.) (ST51). Of course, in the case of a driver not having an unauthorized use preventing function, a normal scan request having no driver information will be issued.

The driver recognition portion 22 of the color scanner 20 receiving this scan request checks the driver information and makes a decision as to whether it is mounted with an unauthorized use preventing function (ST52 and ST53). If the portion judges that it is a driver mounting an unauthorized use preventing function, the portion issues an order for stopping the unauthorized use preventing function to the scanner driver 11 (ST54).

The scanner driver 11 receiving this stops the unauthorized use preventing function and performs normal processing such as intact saving and processing of received image data without performing recognition processing on the image data sent in next (ST55 and ST56). Of course, where the image recognition apparatus 23 does not exist on the color scanner 20 side, such a stop order is not issued. Therefore, given recognition processing is performed on the image data sent in based on the unauthorized use preventing function.

Furthermore, on the color scanner 20 side, after the above-described stop order is issued, or where the scanner drive is not mounted with an unauthorized use preventing function, the scanner side goes to step 57, where a normal scan operation is performed. Image data is taken in. Recognition processing is performed on the image data taken in by the image recognition apparatus 23. A decision is made as to whether it is an image of copy-inhibited matter attempting an unauthorized use (ST57 to ST59).

In the case of an authentic output that is not copy-inhibited matter, image processing such as exposure correction is performed and then the created image data is transferred (ST60 and ST61). On the other hand, where the result of the branch decision of step 59 is that it is copy-inhibited matter, an "error end message" is sent as error response processing to the personal computer 10 side (ST62). The personal computer 10 side receiving this error end message outputs and displays the error message onto the display device (ST63 and ST64). As for this error message, the image of the copy-inhibited matter is taken in and so reading is stopped. Contents permitting the user to recognize that the apparatus is not at fault are displayed.

Where it is judged in step 59 that the output is not authentic, an operation for limiting functions is performed in the same way as in the above modes of practice, rather than sending an error end message as in the present mode of practice. For example, image data that is impaired in quality or resolution, for example, may be transferred. Conversely, in the above-described modes of practice, processing functions of steps 62-64 may be incorporated, and an error message may be output to the personal computer side and displayed.

It is also to be noted that in the above modes of practice, the image recognition apparatus 23 installed on the color scanner 20 side is constituted by hardware and so the unauthorized use preventing function incorporated in the scanner driver 11 is stopped. However, where the unauthorized use preventing function incorporated in the scanner driver 11 is constituted by software, in case that an authentic driver is incorporated in the personal computer 10, recognition processing may be performed by the personal computer side having a high-performance CPU. Where there is no authentic driver, the scanner side may perform the recognition processing.

Although omitted in the figures, in the above modes of practice, a communication interface is installed in each of the personal computer 10 and color scanner 20. Data is sent and received between the personal computer 10 and color scanner 20 via the communication interfaces.

The description of all the above-described modes of practice is based on apparatus where the personal computer incorporates a driver provided with an unauthorized use preventing function and an external device such as a color scanner incorporates a driver recognition portion for making a decision as to whether the driver is authentic or not. However, the present invention is not limited to one that has been completed as apparatus in this way. For example, the above-described steps of processing may be a program (driver software) to be executed by the computer, and a computer-readable recording medium such as a CD-ROM loaded with a driver having an unauthorized use preventing function is also one form of practice of the invention.

INDUSTRIAL APPLICABILITY

As described thus far, in this invention, an image processor does not operate normally unless an authentic connection target provided with an unauthorized use preventing function is used. Consequently, unauthorized use can be certainly prevented.

The invention claimed is:

1. An image processor that is configured to input image data or output image data, which is capable of being connected to an outside of a computer that has a connection target, comprising:
   a decision component for making a decision as to whether said connection target is an authentic connection target having a function of preventing duplication of copy-inhibited matter; and
   a control component for performing normal image processing where said decision component recognizes said connection target as said authentic connection target and for inhibiting normal image processing where said decision component recognizes said connection target not as an authentic connection target, in order to prevent duplication of said copy-inhibited matter, and
   wherein said decision component judges whether the connection target is an authentic connection target or not, depending on whether the connection target can normally decrypt data sent by the image processor to the connection target which the image processor has at least partially encrypted, or depending on whether the image processor can normally decrypt data sent by the connection target which the connection target has at least partially encrypted.

2. The image processor of claim 1, wherein said connection target is a driver program.

3. The image processor of claim 1 wherein said decision component receives data to which security information for identifying said connection target is attached from said connection target and makes a decision as to whether said security information is authentic.

4. The image processor of claim 1, wherein said control component operates to cut off the connection with said connection target where said control component has judged that the connection target is not an authentic connection target.

5. The image processor of claim 1, comprising
   an image recognition component for recognizing whether a copy-inhibited image is contained in input image data;
   wherein in a case where the connection target is judged to be an authentic connection target by said decision component, preventing duplication of copy-inhibited matter provided in said image recognition component or said authentic connection target is stopped.

6. An image processor that is configured to input image data or output image data, which is capable of being connected to an outside of a computer that has a connection target, comprising:
   a decision component for making a decision as to whether said connection target is an authentic connection target having a function of preventing duplication of said copy-inhibited matter; and
   wherein normal image processing is performed only where said connection target is judged to be an authentic connection target by said decision component, in order to prevent duplication of said copy-inhibited matter, and
   wherein said decision component judges whether the connection target is an authentic connection target or not, depending on whether the connection target can normally decrypt data sent by the image processor to the connection target which the image processor has at least partially encrypted, or depending on whether the image processor can normally decrypt data sent by the connection target which the connection target has at least partially encrypted.

7. The image processor of claim 6, wherein said decision component receives data to which security information for identifying said connection target is attached from said connection target and makes a decision as to whether said security information is authentic.

8. The image processor of claim 6, comprising:
   an image recognition component for recognizing whether a copy-inhibited image is contained in input image data;
   wherein in a case where the connection target is judged to be an authentic connection target by said decision component, preventing duplication of copy-inhibited matter provided in said image recognition component or said authentic connection target is stopped.

* * * * *